US012798202B2

(12) United States Patent
Nielsen et al.

(10) Patent No.: US 12,798,202 B2
(45) Date of Patent: Nov. 17, 2026

(54) METHOD FOR MANUFACTURING A PREFORM ELEMENT MADE OF PREFORM BUILDING MATERIAL FOR A WIND TURBINE BLADE

(71) Applicant: Siemens Gamesa Renewable Energy A/S, Brande (DK)

(72) Inventors: Anette Struve Nielsen, Galten (DK); Mogens Nielsen, Aalborg (DK)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 37 days.

(21) Appl. No.: 18/708,738

(22) PCT Filed: Nov. 9, 2022

(86) PCT No.: PCT/EP2022/081265

§ 371 (c)(1),
(2) Date: May 9, 2024

(87) PCT Pub. No.: WO2023/088747

PCT Pub. Date: May 25, 2023

(65) Prior Publication Data

US 2025/0001711 A1 Jan. 2, 2025

(30) Foreign Application Priority Data

Nov. 22, 2021 (EP) .................................... 21209596

(51) Int. Cl.

| | |
|---|---|
| ***B29C 70/44*** | (2006.01) |
| ***B29C 70/54*** | (2006.01) |
| *B29L 31/08* | (2006.01) |

(52) U.S. Cl.

CPC .......... *B29C 70/544* (2021.05); *B29C 70/443* (2013.01); *B29L 2031/085* (2013.01)

(58) Field of Classification Search

CPC ..... B29C 70/342; B29C 70/34; B29C 70/443; B29C 70/446

See application file for complete search history.

(56) References Cited

U.S. PATENT DOCUMENTS

| | | | | |
|---|---|---|---|---|
| 3,666,600 A * | 5/1972 | Yoshino | B32B 27/08 | 425/84 |
| 5,080,851 A * | 1/1992 | Flonc | B29B 11/16 | 156/283 |

(Continued)

FOREIGN PATENT DOCUMENTS

| | | |
|---|---|---|
| CN | 102825797 A | 12/2012 |
| CN | 107618177 A | 1/2018 |

(Continued)

OTHER PUBLICATIONS

PCT International Search Report and Written Opinion of International Searching Authority mailed Jun. 12, 2023 corresponding to PCT International Application No. PCT/EP2022/081265 filed Nov. 9, 2022.

*Primary Examiner* — Matthew J Daniels

(74) *Attorney, Agent, or Firm* — Schmeiser Olsen PLLC

(57) ABSTRACT

A method for manufacturing a preform element made of preform building material for a wind turbine blade is provided, wherein the preform building material is arranged in a sealed vacuum bag arranged in a shape defining mold, whereafter the vacuum bag is evacuated for vacuum fixating the preform building material in the shape defined by the mold.

13 Claims, 9 Drawing Sheets

(56) References Cited

U.S. PATENT DOCUMENTS

| | | | | |
|---|---|---|---|---|
| 5,807,593 | A | 9/1998 | Thompson | |
| 7,014,809 | B2 | 3/2006 | Audette | |
| 7,029,267 | B2 | 4/2006 | Caron | |
| 7,785,517 | B2 * | 8/2010 | Poe | C08G 73/10 425/383 |
| 8,114,241 | B2 | 2/2012 | Lagulli et al. | |
| 8,999,216 | B2 * | 4/2015 | Lind | B29C 70/48 264/258 |
| 11,534,988 | B2 | 12/2022 | Wybrow et al. | |
| 2005/0118376 | A1 * | 6/2005 | Nakagawa | B29C 70/542 156/184 |
| 2008/0182054 | A1 | 7/2008 | Ridges et al. | |
| 2009/0273111 | A1 * | 11/2009 | Bansal | B29C 70/443 264/101 |
| 2013/0048212 | A1 | 2/2013 | Louie et al. | |
| 2014/0175709 | A1 | 6/2014 | Blackburn et al. | |
| 2019/0274193 | A1 | 9/2019 | Kaden et al. | |
| 2021/0023799 | A1 * | 1/2021 | Santoni | B29C 51/10 |
| 2024/0083122 | A1 | 3/2024 | Santoni | |

FOREIGN PATENT DOCUMENTS

| | | | | |
|---|---|---|---|---|
| CN | 108582813 | A | 9/2018 | |
| CN | 110461582 | A | 11/2019 | |
| CN | 112166026 | A | 1/2021 | |
| EP | 0393767 | A2 | 10/1990 | |
| EP | 0415870 | A2 | 3/1991 | |
| EP | 1603723 | A1 | 12/2005 | |
| EP | 2362824 | A1 | 9/2011 | |
| EP | 2661357 | A1 | 11/2013 | |
| EP | 2731772 | A1 | 5/2014 | |
| EP | 3018342 | A1 | 5/2016 | |
| EP | 3102396 | A1 | 12/2016 | |
| EP | 4067037 | A1 | 10/2022 | |
| EP | 4067038 | A1 | 10/2022 | |
| EP | 4079483 | A1 | 10/2022 | |
| EP | 4088901 | A1 | 11/2022 | |
| EP | 4091785 | A1 | 11/2022 | |
| EP | 4091803 | A1 | 11/2022 | |
| EP | 4137288 | A1 | 2/2023 | |
| GB | 2561914 | A | 10/2018 | |
| WO | 2015113571 | A1 | 8/2015 | |
| WO | 2018146178 | A1 | 8/2018 | |
| WO | 2019115522 | A1 | 6/2019 | |
| WO | WO-2019115337 | A1 * | 6/2019 | B29B 11/16 |
| WO | 2019145240 | A1 | 8/2019 | |
| WO | 2019186185 | A1 | 10/2019 | |
| WO | 2020173929 | A1 | 9/2020 | |

* cited by examiner

METHOD FOR MANUFACTURING A PREFORM ELEMENT MADE OF PREFORM BUILDING MATERIAL FOR A WIND TURBINE BLADE

CROSS-REFERENCE TO RELATED APPLICATIONS

This application claims priority to PCT Application No. PCT/EP2022/081265, having a filing date of Nov. 9, 2022, which claims priority to EP application Ser. No. 21/209,596.2, having a filing date of Nov. 22, 2021, the entire contents both of which are hereby incorporated by reference.

FIELD OF TECHNOLOGY

The following refers to a method for manufacturing a preform element made of preform building material for a wind turbine blade.

BACKGROUND

As is commonly known, a wind turbine comprises among others several turbine blades attached to a hub. The blades interact with the wind making the hub rotate. To the hub a generator is coupled, which is driven by the rotating hub. The turbine blades of nowadays' turbines have enormous dimensions in length and width. Their manufacturing is therefore difficult, as big parts need to be handled. One technology for producing such large blades uses preforms, which are preformed smaller blade parts used for building the respective blade shell. These prefabricated preforms are arranged and aligned according to the requested overall geometry of the blade and are finally connected respectively embedded in fiber mats and resin etc. for manufacturing the final large blade or blade part.

Each preform, which usually has a slightly bent geometry with a length of for example 10-12 m and a width of for example 3-5 m, is prefabricated in a specific mold, which mold defines the shape of the preform element. The mold comprises a respective form part, wherein the preform building material like fiber mats and a binding agent and, optional, core elements, are arranged. These materials are fixed in a respective mold part, where they are arranged, by applying a vacuum. This vacuum fixates the building material in the specific arrangement geometry respectively in the geometry defined by the mold part, which geometry corresponds to the requested blade geometry and is in most cases tray-like. For this vacuum fixation, the preform building material is covered with, for example a foil so that the vacuum can be applied to the space between the foil and the mold part, in or on which the building material is arranged. Afterwards heat is supplied to the building material in order to melt the locally arranged binding agent for locally fixating the fiber mats and the core elements etc. by gluing them in the binder matrix provided by the molten binding agent. After this heating operation the preform needs to be cooled down to room temperature, whereafter it is sufficiently stable to be handled by crane equipment or any other comparable handling or lifting means, usually a vacuum suction lifting equipment.

This way of producing the preform elements is quite cumbersome. The molds used for producing the preforms are very complicated in their setup, especially as the heating and cooling system needs to be provided in every mold. This makes the mold very expensive, bearing in mind that a large number of separate molds is needed, as usually at least twenty or more preforms are needed for producing a blade or a blade part.

Further, as the respective mold geometry is designed for a respective geometry of the preform, an extensive reworking of the mold is necessary, when the preform geometry shall be changed, also entailing the adaption of the heating and cooling equipment.

Further, as both the heating and the cooling treatment is performed with the preform building material respectively the hot preform element being arranged in the mold, the mold is occupied. As the heating and the cooling process takes a remarkable time, the whole mold is blocked during these long-lasting procedures, and the productivity is very low. This is even enhanced, as the mold cannot be preheated. The temperature treatment needs to start from room temperature, as all building material needs to be separately arranged in the mold before its vacuum fixation, whereafter the heating may start. Further, it is necessary to cool the hot preform down to room temperature in order to secure its stability for handling it with the lifting equipment.

SUMMARY

An aspect relates to an improved method for manufacturing a preform element for a wind turbine blade.

To address the aspect, embodiments of the invention propose a method for manufacturing a preform element made of preform building material for a wind turbine blade, which is characterized in that the preform building material is arranged in a sealed vacuum bag arranged in a shape-defining mold, whereafter the vacuum bag is evacuated for vacuum fixating the preform building material in the shape defined by the mold.

According to embodiments of the invention, the whole building material, which is necessary for producing the preform element by a heating and cooling treatment, is arranged in a vacuum bag, which completely envelopes or encases the building material. The vacuum bag is arranged respectively manufactured directly in the mold respectively the shape or form defining mold element, which, as mentioned, usually has a tray-like shape. Also, the building material is arranged in the mold, wherein the arrangement is such that the shape of the mold respectively the mold element or the recess etc. defines the requested shape wherein the building material needs to be arranged and which is requested for the preform element. After arranging the building material, the vacuum bag is closed so that it completely envelopes or encases the whole building material. Thereafter, the vacuum bag is evacuated so that the vacuum bag material, which is certainly flexible, is sucked against the building material, which is compressed. As the overall shape of this arrangement is defined by the shape of the mold respectively the mold element, also the vacuum bag and the building material adapts to this shape also during the evacuation process so that, when the evacuation is completed, the evacuated vacuum bag and the compressed building material is vacuum-fixated respectively frozen in this specific mold-defined shape or geometry. As the vacuum bag is evacuated and the building material is, due to the negative pressure in the vacuum bag, firmly compressed, the whole vacuum bag arrangement is very stiff and maintains its shape or geometry, so that finally a very stiff and transferable vacuum bag arrangement including the fixated building material is received in the mold, from where it can be removed and further processed.

The inventive method therefore allows for a very advantageous production of a preform element, as only the arrangement of the building material and the vacuum fixation of the building material in the vacuum bag is performed in the mold so that the mold itself is only used for arranging and fixating the building material. Right after vacuum fixating the building material in the vacuum bag, the stiffened vacuum bag arrangement with the material can be removed from the mold and transferred to a heating means, for example a heating oven, wherein the building material is heated respectively the binding agent is molten for fixating respectively gluing the fiber material like the fiber mats and the core elements etc. in the binder matrix. After this heat treatment, the preform is cooled for example to room temperature by a cooling treatment, whereafter the final preform element may be processed in building the blade or blade part.

This inventive method shows a bundle of advantages. As the mold itself is solely used for arranging the building material in the vacuum bag and for fixating it by evacuating the vacuum bag, no heating or cooling treatment is performed in the mold. Therefore, the mold design is very simple, as no heating or cooling equipment needs to be provided at the mold. Further, as the mold carrier, which may be a frame-like carrier or the like, is not exposed to any heating or cooling, it will be dimensionally stable and last longer, as it is solely carrying the building material and the vacuum bag.

As only the packaging is done in the mold and right after finishing this vacuum packaging the vacuum bag arrangement is removed, immediately afterwards the mold may again be used to start a new building cycle by arranging a new vacuum bag and building material in the mold. The mold itself is only occupied for a very short time, which allows to remarkably increase the through-put and the capacity. As usually a certain number of separate molds is provided, an ongoing production may be realized.

As the heating is performed in a separate heating means, which heating means is solely used for heating the building material, this heating means respectively the oven can be pre-heated so that it is constantly held on the respective process temperature. It is desired that the heating means has a respective capacity so that several separate building material arrangements may be simultaneously heated. The building material is heated e.g. to a temperature of 70-90° C.

Throughout the manufacturing process, the building material is enveloped or encased in the vacuum bag and the vacuum is maintained so that the building material is permanently vacuum-fixated respectively frozen in its position respectively geometry. So, after the final packaging an evacuation step, the evacuated and sealed vacuum bag arrangement is removed from the mold and further processed, i.e. heated and cooled, while the vacuum bag is still enveloping or encasing the building material until the final cooling is done. The building material therefore is securely covered and protected by the vacuum bag, which therefore not only serves the purpose of creating the vacuum that maintains the pre-packed preform building material in its geometry, but also serves as a protection means throughout the whole process and even after the cooling, when for example the built preform element is not immediately used for building a blade or blade part, but shall be stored in a storage area until further processing. The vacuum bag protects the building material and the final preform against dirt or moisture or any other negatively influencing circumstances.

The vacuum bag itself is sufficiently flexible respectively built of a sufficiently flexible foil-like or mat-like material, which is sufficiently air-tight so that the evacuation and vacuum-fixation is possible. As the vacuum bag envelopes, the building material throughout the complete process, and especially during the heating process, the vacuum bag material is also sufficiently heat-resistant so that it easily stands the heating temperature of e.g. 70-90°. The vacuum bag material is for example, a polymer foil made of a polymer with a sufficient heat resistance, or for example made of a textile or fiber mat which is coated with a polymer coating material having the required temperature properties or the like. In an embodiment, a simple and sufficiently thin polymer film is used, as it is a light weight vacuum bag solution which allows an easy handling and arranging of the vacuum bag in the mold.

According to embodiments of the invention, it is desirable that at least one lower vacuum bag layer is arranged in the mold, whereafter the building material is arranged on the lower vacuum bag layer, whereafter at least one upper vacuum bag layer is arranged covering the building material and overlapping the lower vacuum bag layer, whereafter both lower and upper vacuum bag layers are sealed together building the sealed vacuum bag, which is then evacuated. According to this embodiment, the vacuum bag itself is manufactured right in the mold by overlaying a lower and an upper vacuum bag layer with the building material sandwiched in between. The layers are then sealed so that the air-tight vacuum bag is finally built with the building material enclosed in it, whereafter the air is evacuated from the bag for vacuum-fixating the building material in the defined shape. The use of these separate vacuum bag layers first allow for a simple manufacturing of the sealed bag itself, and second also for a simple arrangement of the building material, as this can be perfectly arranged on the lower vacuum bag layer in the desired shape or arrangement, whereafter the upper vacuum bag layer is put in place.

For air-tight sealing of the overlapping vacuum bag layers, both layers may either we welded together by using a respective welding means like a heating means or ultrasonic welding means, or by gluing them together using a glue arranged between them, which glue, e.g. a liquid glue or a butyl tape or the like, may be either manually arranged for example on the lower vacuum bag layer, or which glue may already be arranged on the lower vacuum bag layer before it is placed in the mold. However the sealing is done, it provides an air-tight sealed vacuum bag which may be sufficiently evacuated.

In order to evacuate the sealed vacuum bag, one or more connection means may be arranged in the vacuum bag extending to the outside of the vacuum bag, by punching through the upper vacuum bag layer. The evacuation means comprises an evacuation pump, which is connected to the vacuum bag connection means allowing for sucking the air out of the bag. These connection means are arranged after the building material is arranged on the lower vacuum bag layer, whereafter the upper vacuum bag layer is arranged such that the connection means extend or punch through the upper vacuum bag layer, also air-tight sealed, so that the connection means can be connected from the outside by a respective hose connected to the evacuation pump. The connection means may after evacuating the bag certainly be closed like a valve, so that, when the hose is removed, the connection is shut off and the vacuum is maintained in the bag.

In an embodiment, a filter means may be arranged in the vacuum bag, to which the connection means is coupled. This filter means is for example a net or a strip or the like, which ascertains that the connection means is not blocked during the evacuation process, so that the vacuum bag may be completely evacuated.

The lower and the upper vacuum bag layer may each consist of only one layer of for example a polymer foil or sheet. In an alternative, it is also possible that the lower and/or the upper vacuum bag layer consists of two or more separate sub-layers arranged in a stack. So, for example, the lower vacuum bag layer comprises two sub-layers, which are arranged above each other, allowing for example for enhancing the stability by doubling the layer thickness. Further, this multi sub-layer arrangement allows for arranging at least one stiffening means or stiffener between at least two sub-layers, of the lower vacuum bag layer. The integration of one or several stiffening means allows for providing the vacuum bag itself with sufficiently stiff support elements, which support the vacuum bag and the building material from underneath. Such a stiffening means may for example be or comprise one or more longitudinal rods or sticks or the like, which provide a sufficient longitudinal stiffness but not in the transverse direction. In an alternative, also a mesh or net may be used, which provides a sufficient stiffness in the longitudinal and transverse direction, wherein this net is certainly sufficiently flexible in order to adapt its form or shape to the shape of the mold or mold element. The rods or mesh or net or whatever stiffening means is used, is also made of a polymer, which in turn is also sufficiently heat-stable or durable, so that it stands the process temperatures. In an alternative, also metal stiffening means may be used, for example made of aluminum, which is a light-weight material. The stiffening means like the rods, or the mesh may be recycled, as they, and also vacuum bags, have standardized dimensions.

As mentioned, the vacuum bag arrangement with the building material is after the evacuation a sufficiently stiff arrangement, which maintains its shape. This allows for a separate handling of the evacuated vacuum bag arrangement without any further support means. For a simple handing of the evacuated vacuum bag arrangement, a vacuum bag is used or prepared comprising several, reinforced handling holes arranged at one or more side areas of the bag. These handling holes may for example receive pins or other gripping or coupling any kind of transfer means, which is adapted to for example transfer the evacuated vacuum bag arrangement from the mold to for example an intermediate transport means, which transports the evacuated vacuum bag arrangement to the heating means or the like. The handling holes, which are for example reinforced by a metal or plastic ring sealed or embedded in the layer arrangement are arranged at the side areas of the vacuum bag, for example in a certain number along the longitudinal sides and/or in a certain number along the transverse sides of the usually rectangular vacuum bag. The optional reinforcement rings may be sealed in the layer stack when the layers are sealed, desirably by welding, so that a sufficiently tight arrangement of the metal ring in the layer stack is realized. The rings are made of metal having a circular or rectangular cross-section and are arranged such that either a longitudinal or transverse pulling is possible, or even both.

According to embodiments of the invention, the evacuated vacuum bag with the fixated building material may be transferred to a transport means, for example a rack, wherein the transport means comprises a movable transport belt means with pins engaging in the holes of the vacuum bag, which transport belt means pulls the vacuum bag onto the transport means. As mentioned, the evacuated vacuum bag arrangement is, right after the evacuation is done, removed from the mold so that the mold can be used for the next production cycle. The vacuum bag with the building material may then be directly transferred into the heating means, if the heating means is directly connected to the mold. In an embodiment, an intermediate transport means is provided, like a movable rack, which for example moves along a number of separate molds for collecting a number of separate vacuum bag arrangements, which are then all loaded into the heating means like the oven to be simultaneously heated. This transport means may for example be equipped with a movable transport belt means having pins or the like engagement elements, which are adapted to engage into the respective holes of the vacuum bag for connecting the vacuum bag and pulling it onto the rack.

In an alternative to using such a transport means with a transport belt means, it is possible that the mold is equipped with a frame having fixation pins, wherein the or both lower and upper vacuum bag layers comprising the reinforced holes are arranged such that the frame pins engage the reinforced holes, wherein, after vacuum fixating the building material, the frame with the evacuated vacuum bag is transferred to a transport means, for example a rack, comprising receiving means for the frame. Here, the mold itself is equipped with a transfer means in form of a frame, having fixation pins, which engage into the respective vacuum bag holes, so that the bag is hooked onto the frame. After the evacuation, the frame is transferred to the transport means like the rack, which comprises respective receiving means like rails for the frame. The vacuum bag itself hangs on respectively in the open rectangular frame while still maintaining its shape.

In another alternative embodiment, a flexible transport plate is arranged in the mold adapting the shape of the mold, onto which flexible transport plate the vacuum layers and the building material is arranged, wherein, after the vacuum fixation of the building material in the vacuum bag, the flexible transport plate with the evacuated vacuum bag arrangement is transferred to a transport means, for example, a rack. In this alternative, a support plate, i.e. the flexible transport plate, is arranged in the mold. This transport plate, for example a thin polymer or metal plate, completely adapts to the mold shape. After the vacuum bag and the building material is arranged and evacuated, the whole arrangement comprising the transport plate and the vacuum bag arrangement is transferred to the transport means.

Further, according to the inventive method, a heating means and, a cooling means following the heating means, is provided, which either comprises or comprise a movable transport belt means with pins engaging in the holes of the vacuum bag, which transport belt means pulls the vacuum bag into the heating means or the cooling means, or which according to other alternatives comprises or comprise receiving means for the frame or the flexible transport plate, onto which the frame or the flexible transport plate is transferred. In embodiments, the method comprises the provision at least of a heating means, also of a separate active cooling means, which are adapted to allow a proper transfer of the evacuated vacuum bag arrangement, either directly for example by a respective transport belt arrangement, or indirectly by receiving the frame or the transport plate.

As already mentioned, the lower and the upper vacuum bag layers used in the process are made of a material, desirably a polymer material, having a heat resistance of at least 90° C., or of at least 100° C. In an embodiment, the heat resistivity is even higher, desirably at least 120° C. or 150°

C. As mentioned, the vacuum bag envelopes the building material throughout the whole process, thus also during the heating process, wherein the building material is heated to for example 70-100° C. To avoid that the vacuum bag and therefore the vacuum fixation is deteriorating during this heating process, the bag layers are sufficiently heat resistant, so that they are not negatively influenced by the higher temperature.

Embodiments of the invention further relate to a vacuum bag adapted to be used in a method as previously described. The vacuum bag is characterized by a lower vacuum bag layer, an upper vacuum bag layer and a sealing connection between both layers for sealing the vacuum bag, and one or more connection means for releasably connecting an evacuation means to the vacuum bag. The upper and lower layer are identical especially in regard of thickness, color, length and width etc., it is also possible that they differ in thickness, width and length and color etc. Both vacuum bag layers consist of at least one layer, wherein both layers are separately arranged and then connected by welding or by gluing in order to have an air-tight sealing connection between both layers allowing an evacuation of the vacuum bag. The vacuum bag itself has a length of e.g. 10-16 m and a width of e.g. 3-6 m, so that respective large building material in form of fiber mats and core elements made of balsa wood or foamed polymer or the like, together with a binding agent, can easily be arranged in the vacuum bag. The vacuum bag itself is somehow larger than the building material, as the two layers building the bag overlap in the edge regions, where they are connected respectively welded together.

The connection means, which are arranged in the vacuum bag, and which can be connected from the outside, are for example short pipes or sleeves, which extend or punch through the upper bag layer, and which are air-tight arranged or fixated for example to the inside of the upper layer. An air-suction hose or pipe can easily be connected to the respective connection pipe or sleeve, so that the air can be evacuated. The connection means can certainly be closed or locked, when the evacuation process has ended and when the hose or pipe shall be decoupled from the connection means, so that the vacuum is still upheld. So, the connection means are valve-like or comprise a valve which can be closed when necessary.

A filter means like a net or a strip or the like, which ensures that the connection means is not blocked during the evacuation process, may be connected to the connection means inside the vacuum bag.

In an embodiment, each lower and upper vacuum bag layer consists of only one layer made of a polymer foil, which may be stiffened by a textile web or the like. In an alternative, it is also possible that the lower and/or the upper vacuum bag layer consists of two or more separate sub-layers arranged in a stack. Especially, when the vacuum bag is very large, it may be advantageous in embodiments to overlay two lower and may be thinner sub-layers, which then, in double, provide the respective layer thickness, and which are easier to handle than a single but sufficiently thick layer. The layer doubling further provides a thicker and stiffer support when necessary due to the weight of the building material.

Another advantage of the layer doubling is that it is possible to arrange at least one stiffening means, one or more rods or a mesh or a net of a polymer or metal, between at least two sub-layers, of the lower layer. These stiffening means support and stiffen the vacuum bag. While longitudinal rods or sticks stiffen in the longitudinal direction, a mesh or grid or the like stiffens in both the longitudinal and transverse direction. In case a mesh or a net or grid is used, it is certainly sufficiently flexible, so that it easily adapts to the shape of the mold.

Further, it is possible that several, reinforced, handling holes are arranged at one or more side areas of the bag, which allow to be engaged by respective transport or handling means like pins or grippers or the like necessary for moving respectively pulling the evacuated vacuum bag arrangement.

Finally, the lower and upper vacuum bag layers are made of a material, desirably a polymer material, having a heat resistance of at least 90° C., or of at least 100° C. The temperature stability is chosen such, that it is sufficiently higher than the maximum heating temperature applied during the manufacturing process, wherein the vacuum bag is used. It is desired that the temperature, when the polymer layer material deteriorates, is at least 30° C. higher than the maximum heating temperature applied.

The polymer material from which the vacuum bag layers or sub-layers are made of, is chosen such that it does not adhere or stick to the building material, which, as mentioned, is heated during the manufacturing process in order to melt the binding agent. So, it is ascertained that no sticking between the molten and/or cured binding agent and the bag material occurs.

Embodiments of the invention further relate to a mold arrangement for preparing a preform element for a wind turbine. This mold arrangement comprises a shape-defining surface and at least one vacuum bag as previously mentioned arrangeable or arranged on the mold surface. So, the mold arrangement comprises the mold itself, which has a mold element with a shape-defining mold surface. This mold element is interchangeable so that it can be changed to another mold element having a slightly different shape-defining mold surface, and which allows to build a preform element with a different geometry. Further, the mold arrangement comprises one or more respective vacuum bags, which may be arranged or built directly on the mold surface itself, as mentioned above, by simply arranging the respective layers and, if provided, sub-layers on the mold surface for building the lower surface, followed by arranging the building material, and then followed by arranging the upper bag layer or sub-layers for finally building the vacuum bag, whereafter the layers solely need to be sealed and connected together.

For simplifying the arrangement of the respective vacuum layers or sub-layers, the inventive mold arrangement is characterized in that one or two rolls of vacuum layer material are arranged at respective unwinding means such that the material can be pulled onto the mold for building the respective vacuum bag layer. The one or the several rolls of vacuum layer material are arranged at one end of the longitudinal mold so that the layer material can simply be unwound from the roll and be pulled over the mold. It only needs to be cut to the desired length.

Further, the mold arrangement comprises a sealing means for establishing a sealed connection between the lower and the upper layer, wherein the sealing means is a welding means and comprises several welding bars extending along the sides of the mold, which bars are movable onto the layers for welding them together. These welding means, respectively the longitudinal bars, which are for example pivotably arranged at a mold carrier or a mold frame, are simply placed onto the overlapping layers. When heat is applied to the layers, they locally melt and firmly bond together by a substance-to-substance-bond, which provides an air-tight sealed connection.

The mold arrangement may further comprise a transferable frame with pins which engage in reinforced holes provided at the lower and/or the upper layer. This frame is a transport means, which allows for transporting the evacuated bag arrangement fixed or hooked to the frame pin from the mold to a transport means like a rack.

Finally, embodiments of the invention refer to a manufacturing arrangement for preparing a preform element for a wind turbine blade, comprising at least one mold arrangement as previously described, at least one transport means for transporting a vacuum-fixated preform building material enveloped in a vacuum bag, at least one heating means adapted to receive and heat the preform building material enveloped in the vacuum bag, and, optionally, at least one cooling means adapted to receive and cool the heated preform building material enveloped in the vacuum bag.

BRIEF DESCRIPTION

Some of the embodiments will be described in detail, with references to the following Figures, wherein like designations denote like members, wherein.

DETAILED DESCRIPTION

Figure 1:
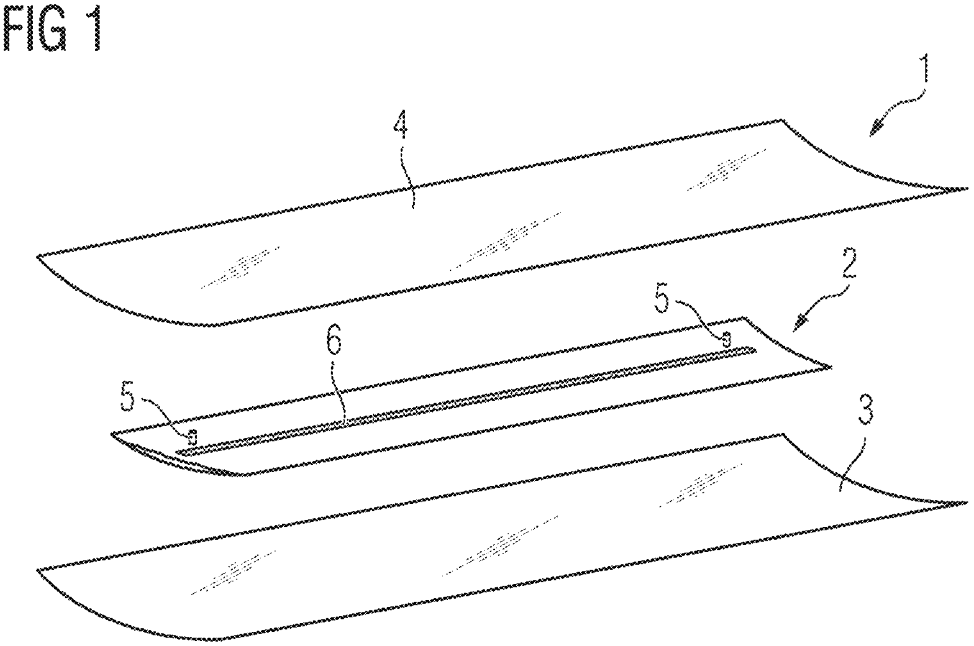
FIG. 1 shows an exploded illustration of the vacuum bag building items and the building material.

FIG. 1 shows a principle exploded illustration of a vacuum bag 1 respectively the items used for building the vacuum bag 1, with the building material 2 to be enclosed in the vacuum bag 1. The vacuum bag consists of a lower vacuum bag layer 3, which is a polymer film or a foil. It further consists of an upper vacuum bag layer 4, also in the form of a polymer film or foil. As shown, the layers 3, 4 have a rectangular shape, as the overall vacuum bag 1 shall have a rectangular shape in order to receive the building material 2. The length of the vacuum bag 1 respectively the layers 3, 4 is approximately between 10-16 m, the width is between approximately 3-6 m. The dimensions are chosen in order to ascertain a sufficient overlapping of the edge or side regions of both layers 3, 4, wherein regions they are sealed together by welding.

The vacuum bag 1 respectively the vacuum bag arrangement further comprises, in this example, two connection means 5 like short sleeves or pipes, which are air-tight arranged in the vacuum bag 1 underneath the upper layer 4, through which they are for example punched. They are used for connecting a respective evacuation means like a pump to the inner of the vacuum bag 1 for evacuating it. The two connection means 5 are further connected by a filter means 6 like a net or the like, which prohibits any blocking of the connection means 5, through which the air comprised in the vacuum bag 1 is sucked, assuring that a complete evacuation is possible.

The preform building material 2 itself comprises one or more fiber mats, for example glass fiber or carbon fiber mats, and if necessary one or more core elements for example made of balsa wood or a foamed polymer or the like. It further comprises a locally applied binding agent, which, when heat treated, as described below, melts and embeds the other building material like the mats etc. in a local binder matrix, which, after curing, firmly fixates the building material in the desired arrangement and shape. It is only applied locally, so that resin applied during the resin infusion when building the whole blade or blade part can flow into and through the building material. The binding agent may be a powder or granulate of a hot melt glue or the like.

For producing the preform element, it is necessary to arrange the preform building material 2 in a respective defined shape or geometry. For this purpose, the items as shown in FIG. 1 are arranged in a mold, which has a mold surface having a tray-like shape. This mold or mold surface defines the overall and final geometry the finally built preform element shall have. To realize this, it is sufficient to arrange the building material 2 in this required shape or geometry. First, the flexible lower layer 3 is arranged in the mold or a mold surface and adapts exactly to the shape of the mold, as the layer 3 is e.g. a flexible polymer foil. FIG. 1 already shows a slightly bent geometry of the lower layer 3. On this lower layer 3, the building material 2 is arranged. This is followed by arranging the connection means 5 and the filter means 6 on the building material 2, whereafter the upper layer 4 is arranged, which overlays the building material 2 and also overlaps the lower layer 3 in the edge regions. The connection means 5 are punched through the upper layer 4 to have the respective outside connection positions for connecting an evacuation hose or the like.

When all items are arranged, the upper and lower layers 3, 4 are connected and are air-tight sealed together, desirably by welding, which is easily possible, as both layers 3, 4 are polymer films or foils. A heat or ultrasound welding is easily possible.

After a completely air-tight vacuum bag 1 is built, the evacuation pump is connected to the connection means 5 by respective hoses. When the pump is turned on, the air is sucked out of the vacuum bag 1, so that, as the layers 3, 4 are firmly pressed towards each other, also the building material 2 is firmly compressed. Due to the evacuation, the evacuated vacuum bag 1 respectively the whole arrangement maintains its mold-defined shape after final evacuation. So, the final evacuated bag arrangement is firmly adapted to the requested final shape of the preform element to be built, which is defined by the respective mold geometry.

Figure 2:
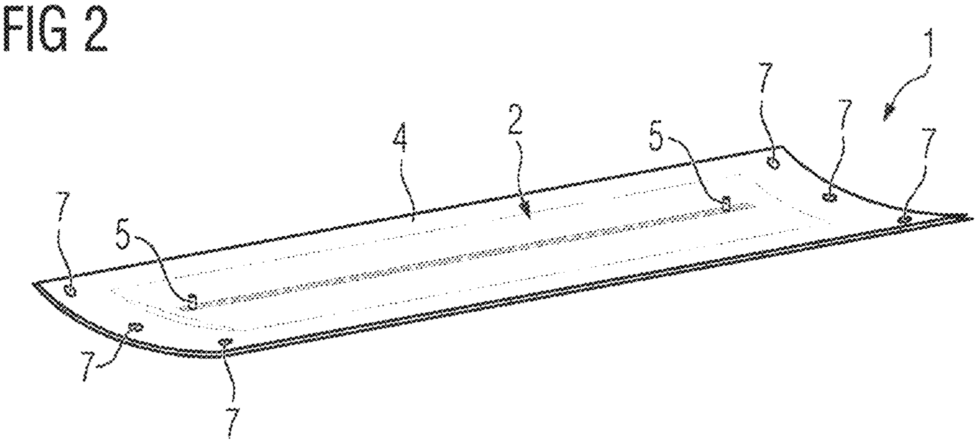
FIG. 2 shows a perspective view of the final vacuum bag with the enclosed building material.

FIG. 2 shows the vacuum bag 1, which is completely sealed and evacuated. On the upper side, the punched through connection means 5 are shown, which are punched through and air-tight connected to the upper layer 4. The building material 2 is only shown by the dashed lines, and it is completely enveloped in the vacuum bag 1.

FIG. 2 further shows the possibility to provide reinforced holes 7 in edge areas of the vacuum bag 1, which are used for transporting the whole arrangement of vacuum bag 1 and building material 2, as will be explained later.

Figure 3:
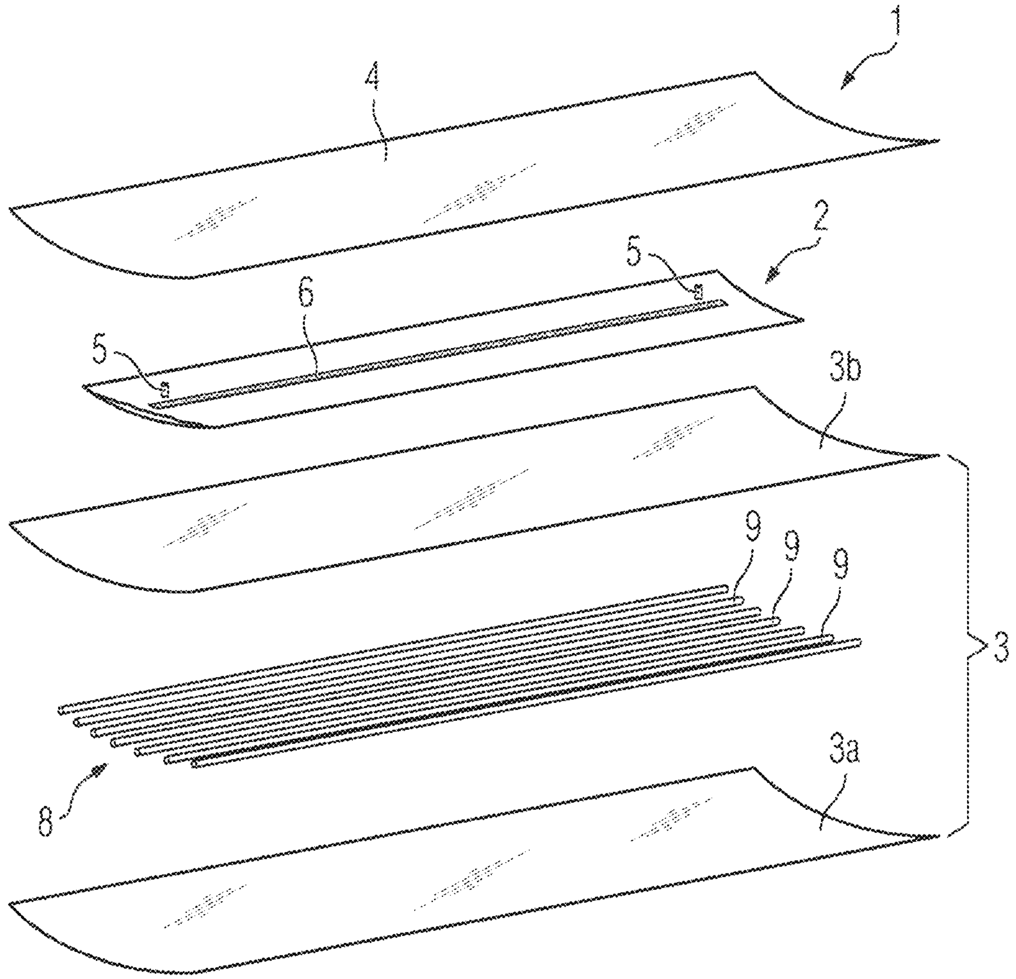
FIG. 3 shows an exploded view of another embodiment of the vacuum bag building items and the building material.

FIG. 3 shows an exploded view of another vacuum bag 1, into which the preform building material 2 shall be arranged. This vacuum bag 1 comprises a lower vacuum bag layer 3, which consists of two separate sub-layers 3*a*, 3*b*. This double-layered arrangement (it is also possible to for example have a triple sub-layer arrangement) is advantageous, if the weight of the preform building material 2 requests a thicker lower layer for providing a better support.

For building the vacuum bag 1 respectively the whole arrangement, first the sub-layer 3*a* is arranged in the mold. Then the second sub-layer 3*b* may be arranged directly on the first sub-layer 3*a*. Or, as shown in FIG. 3, it is possible to provide a stiffening means or stiffener 8, here in form of respective parallelly arranged rods 9, on the first sub-layer 3*a*. The stiffening means 8 provides a stiffened support of the building material 2 from the bottom for stabilizing the underside of the whole arrangement. On this stiffening means then the second sub-layer 3*b* is arranged, which totally overlaps the first sub-layer 3*a*.

Then the building material 2 is arranged on the sub-layer 3*b*, followed by the arrangement of the connection means 5 and optionally the filter means 6. Finally, the upper vacuum bag layer 4, which in this example is a single layer, is arranged on top, wherein the connection means 5 are punched through. The upper vacuum bag layer 4 overlaps the lower vacuum bag layer 3 at the edge or side regions, where afterwards the air-tight welding is performed in order to provide a completely sealed vacuum bag 1 comprising the building material 2.

Again, the evacuation pump is connected to the connection means 5 and the vacuum bag 1 is evacuated, thereby firmly vacuum fixating the building material 2 according to the mold-defined shape.

The connection means 5 can be locked or closed, when the evacuation process has ended so that, when the hoses are decoupled, the applied vacuum in the vacuum bag 1 is maintained.

Figure 4:
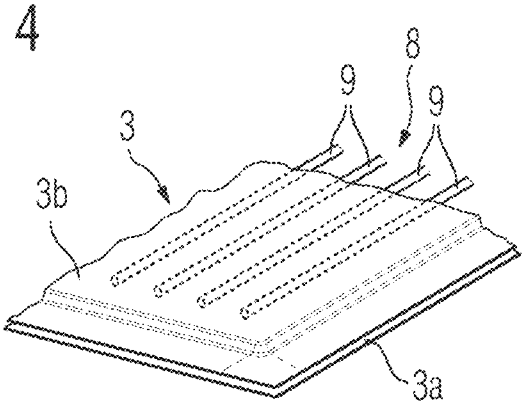
FIG. 4 shows an enlarged partial view of the lower layer of the vacuum bag having stiffening a first embodiment.

FIG. 4 shows an enlarged view of the lower layer 3 of the embodiment of FIG. 3. It shows the lower sub-layer 3*a* and the upper sub-layer 3*b*, as well as the stiffening means 8 here in form of the rods 9 arranged between both sub-layers 3*a*, 3*b*.

Figure 5:
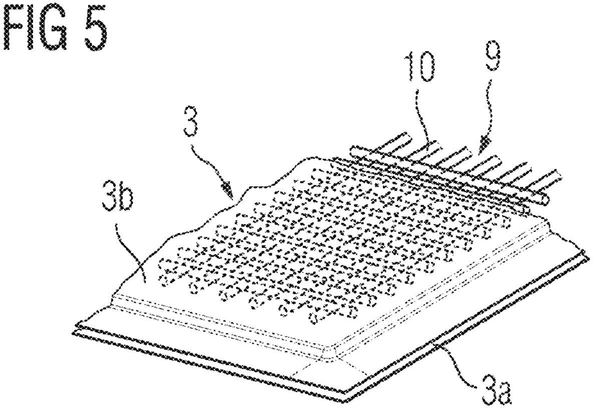
FIG. 5 shows a view according to FIG. 4 with a stiffening a second embodiment.

Another embodiment, comparable to the one of FIG. 4, is shown in FIG. 5. It again shows the lower layer 3 comprising the lower sub-layer 3*a* and the upper sub-layer 3*b*. Here the stiffening means 9 arranged between both sub-layers 3*a*, 3*b* is a mesh or grid 10, which stiffens in the longitudinal and the transverse direction, but is certainly flexible enough in the transverse direction to completely adapt to the shape of the mold geometry.

Figure 6:
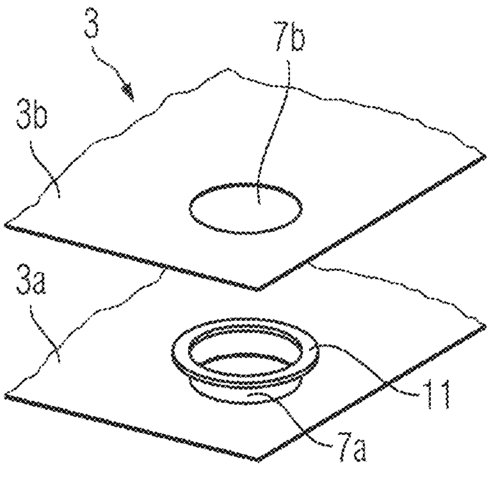
FIG. 6 shows a perspective partial exploded view of the lower vacuum bag layer in the area of a reinforced hole.

FIG. 6 shows an enlarged exploded view, for example of the lower layer 3, here comprising the sub-layer 3*a* and the sub-layer 3*b*. Both are provided with punched holes 7*a*, 7*b*. Sandwiched between both sub-layers 3*a*, 3*b*, a reinforcement ring 11, for example a metal ring, is arranged. When the sub-layers 3*a*, 3*b* are in their final position, the reinforcement ring 11 is sandwiched. During the welding process, also this area is heated so that the reinforcement ring 11 is firmly welded or embedded into the sub-layer arrangement, reinforcing the final hole 7.

Figure 7:
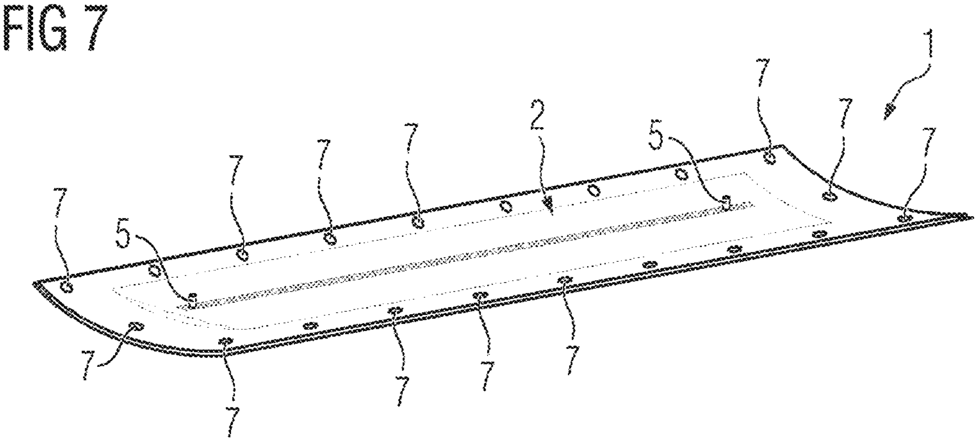
FIG. 7 shows a perspective view of another embodiment of a vacuum bag with the enclosed building material, having reinforced holes at all four side areas.

An embodiment of a vacuum bag 1 respectively a vacuum bag arrangement also comprising the already enclosed and vacuum-fixated building material 2 is shown in FIG. 7. In this embodiment, the setup of which corresponds either to the setup of FIG. 1 or FIG. 3, the vacuum bag 1 comprises reinforced holes 7 as well as the longitudinal sides as at the transverse sides, as shown. These holes 7, which interact with respective pins or grippers or the like transport elements, allow the connection to such a transport element. By this transport element it is possible to either pull the vacuum bag arrangement comprising the vacuum bag 1 and the building material 2 in the longitudinal direction, or in the transverse direction.

The material the layers 3, 4 respectively the sub-layers are made of, is a polymer material, which can be produced into a respective flexible foil or film, and which is sufficiently air-tight, so that a good and stable evacuation is possible. The polymer material used is also sufficiently heat-resistant, so that it is easily possible to apply heat to the vacuum bag 1 without the danger that the bag material deteriorates. During the manufacturing process of the preform element, heat is applied to melt the binding agent. The temperature is for example between 70-100° C. during this heating process. Therefore, a polymer material is chosen which shows a heat resistivity of at least 120° C., or of at least 150° C. This ascertains that the vacuum bag 1 may encase the building material throughout the whole manufacturing process and may even wrap the final preform building element until the time immediately before it is processed into the respective blade element, so that the vacuum bag is not only the means for allowing the vacuum fixation in the desired shape or geometry, but also a protection means, which protects the building material and the finally built preform element for a longer time.

Figure 8:
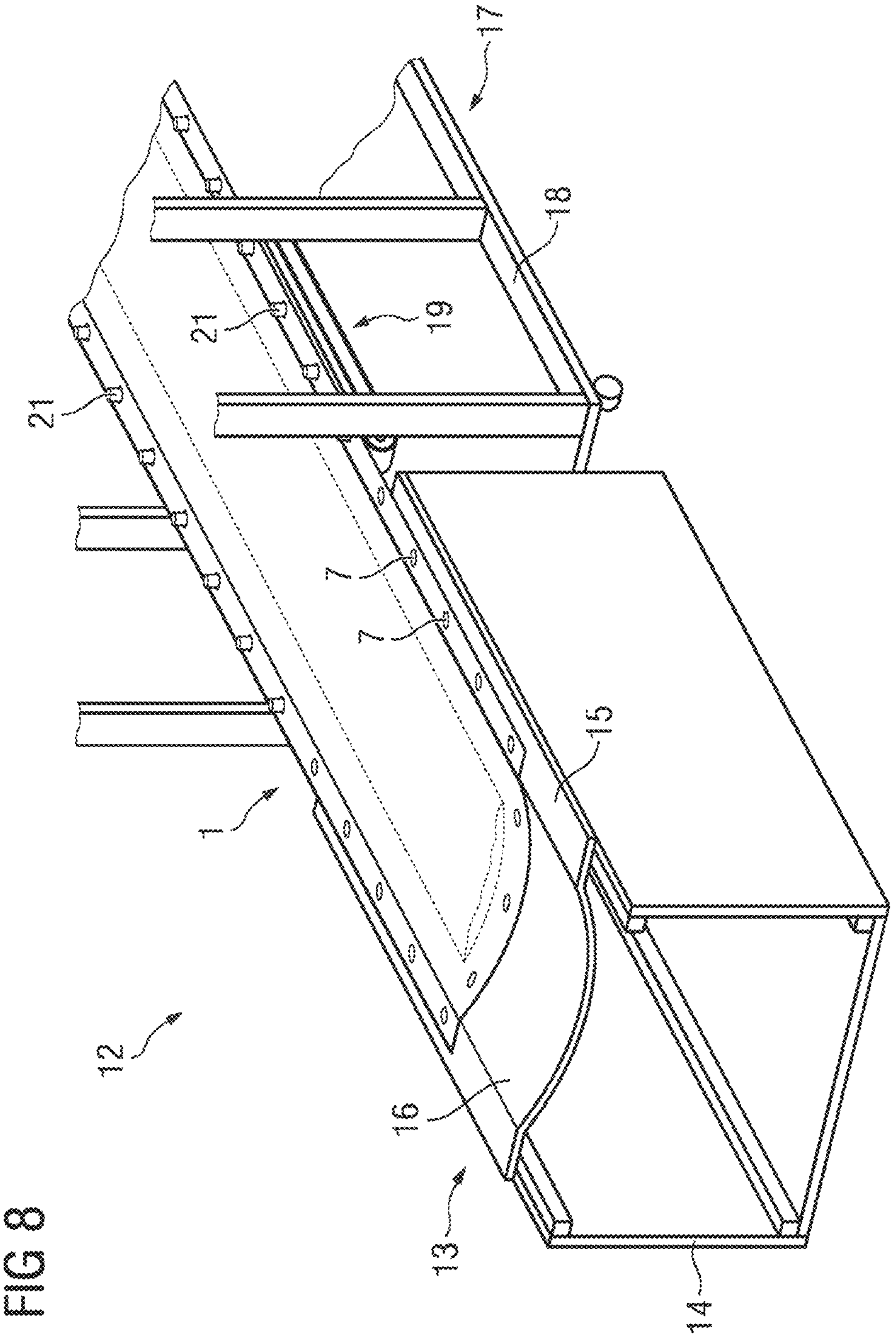
FIG. 8 shows a perspective principle illustration, partially cut, of a mold arrangement and an associated transport means.

FIG. 8 shows an embodiment of a mold arrangement 12, comprising a mold 13 having a mold carrier 14, on which a changeable mold element 15 having a shape-defining mold surface 16 is arranged. On this mold surface 16, which here is for example tray-like, the vacuum bag 1 respectively the respective layers 3, 4 and the preform building material 2 is arranged, and on which finally the sealed and evacuated vacuum bag 1 respectively the whole arrangement is built. It needs to be mentioned that the mold 13 is certainly much longer, it has a length, which at least corresponds to the length of the vacuum bag 1, e.g. 10-16 m, and a width, which at least corresponds to the width of the vacuum bag 1, e.g. 3-6 m.

Figure 9:
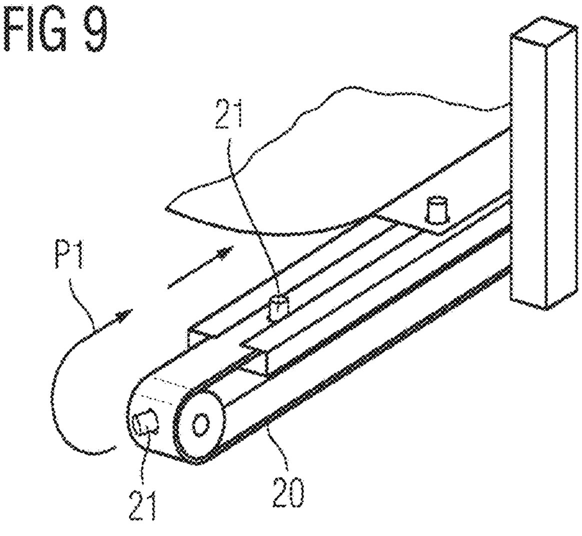
FIG. 9 shows an enlarged view of the transport belt arrangement of the transport means.

In FIG. 8, also a transport means 17, here in form of a rack 18, which is movable on the floor, is shown, on which transport means 17 the vacuum bag 1 comprising the vacuum-fixated building material 2 is transferred. The rack 18 comprises a transport belt means 19, which, see FIG. 9, comprises a circulating belt 20 having a number of pins 21 extending from it. These pins 21 engage in the respective holes 7 of the vacuum bag 1, as shown in FIG. 8. The rack 18 is directly moved to the mold 13, whereafter the first pin 21 is inserted in a hole 7. Right after this, the transport belt means 19, which comprises two respective transport belts 20 arranged on both sides, is turned on so that the moving belt 20 (see arrow P1) pulls the vacuum bag 1 with the building material 2 into the rack 18.

Figure 10:
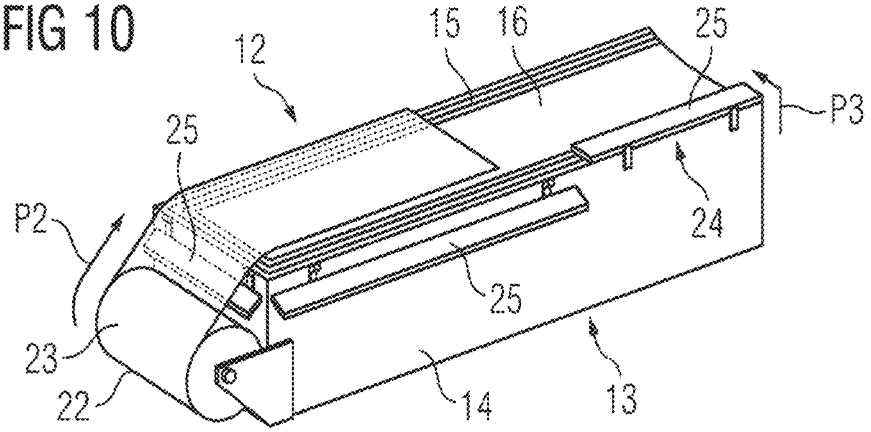
FIG. 10 shows another partial and principle illustration of a second mold arrangement comprising one vacuum bag material roll.

FIG. 10 shows another mold arrangement 12, again comprising a mold 13 with a carrier 14 and a mold element 16. The mold 13 is equipped with a roll 22 of vacuum layer material 23, which vacuum layer material 23 is unwound from the roll 22 and pulled over and onto the mold element 16, as shown in FIG. 10 by the arrow P2. When the layer material 23 is completely pulled over the mold element 16, the material 23 is simply cut at its end. The first layer 3 or sub-layer 3*a* is then arranged on the mold element 16. In the same way, also the upper layer 4 and, if provided, the second sub-layer 3*b*, is pulled and arranged.

FIG. 10 furthermore shows a sealing means 24 realized in form of several welding bars 25, which are arranged on all longitudinal and transverse sides of the mold carrier 14. They can be pivoted from a non-working position (shown at the left and the middle welding bar 25 hanging down from the carrier 14) and a working position (shown by the right welding bar 25), into which it is pivoted according to arrow P3. In this working position, the welding bars 25 lay on top of the layers 3, 3*a*, 3*b*, 4, which shall be sealed together by heating them and realizing a substance-to-substance-bond. After this sealing step, the welding bars 24 are simply pivoted into the non-working position, whereafter the evacuation can take place.

Figure 11:
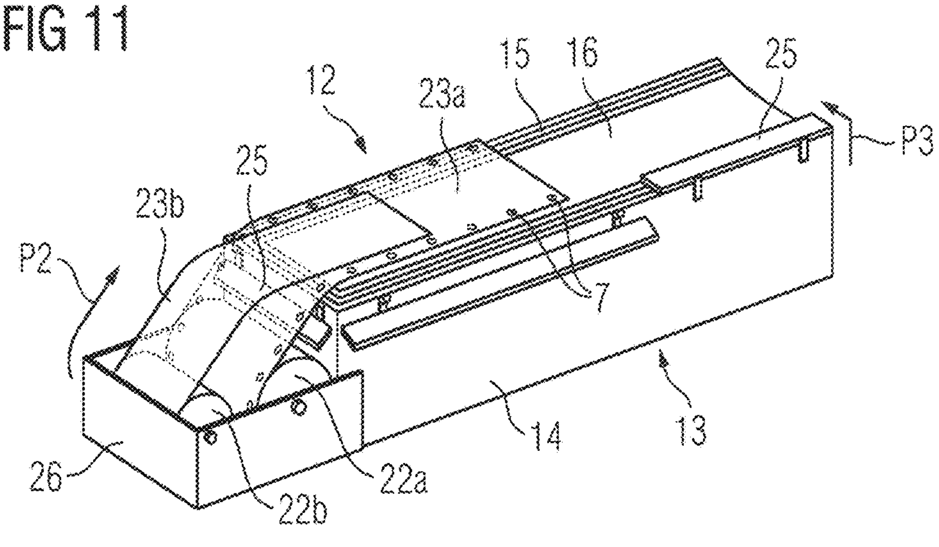
FIG. 11 shows a perspective principle illustration of a further mold arrangement comprising two separate vacuum bag material rolls.

FIG. 11 shows an embodiment of a mold arrangement 12 having a mold 13 with a mold carrier 14 and a mold element 15 with the respective mold surface 16. In this embodiment, two rolls 22*a*, 22*b* each comprising of a vacuum layer material 23*a*, 23*b* are arranged at the mold carrier 14. They can, as shown in FIG. 11, be simply unwound separately as shown by the arrow P2. The layer material 23*a* is wider than the layer material 23*b*, and is already provided with respective holes 7, which may already be reinforced by respective reinforcement rings 11, in case the layer material 23 is already prefabricated in this way.

For arranging the rolls 22*a*, 22*b*, a respective rack 26 is arranged at the carrier 14, where the rolls 22*a*, 22*b* can be inserted and pivotably be arranged. The storage rack 26 may also be movable and therefore be positioned at the respective mold, where it is needed.

Although in this embodiment the layer material 23*a* is wider than the layer 23*b*, this is not necessarily the case. It is also possible that the upper layer material 23*b* may be wider than the lower layer material 23*a*, wherein in this case the upper layer material 23 comprises the holes 7. In case they both have the same width, they are both equipped with respective holes, if they are not punched when the respective layers are already arranged at the mold element 15.

Figure 12:
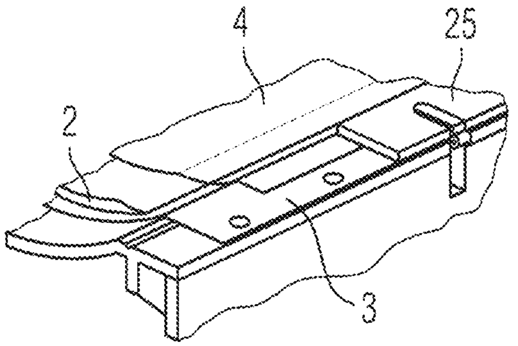
FIG. 12 shows a partial enlarged view of the arrangement for welding the layers together.

FIG. 12 shows an enlarged view of the welding area. It shows the welding bar 25 in the working position. It overlaps the lower layer 3 and the upper layer 4 especially in the region, where the upper layer 4 also overlaps the lower layer 3. In this edge area, the welding, i.e. the substance-to-substance bond shall be realized by locally heating the polymer material.

Figure 13:
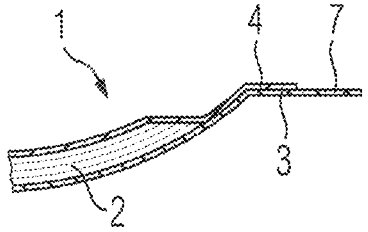
FIG. 13 shows a partial cut illustration of the vacuum bag in the side region.

FIG. 13 shows a partially cut view of the vacuum bag 1 with the enclosed building material 2. It shows the welded layers 3, 4, together with the reinforced hole 7 arranged close to the edge of the lower layer 3.

Figure 14:
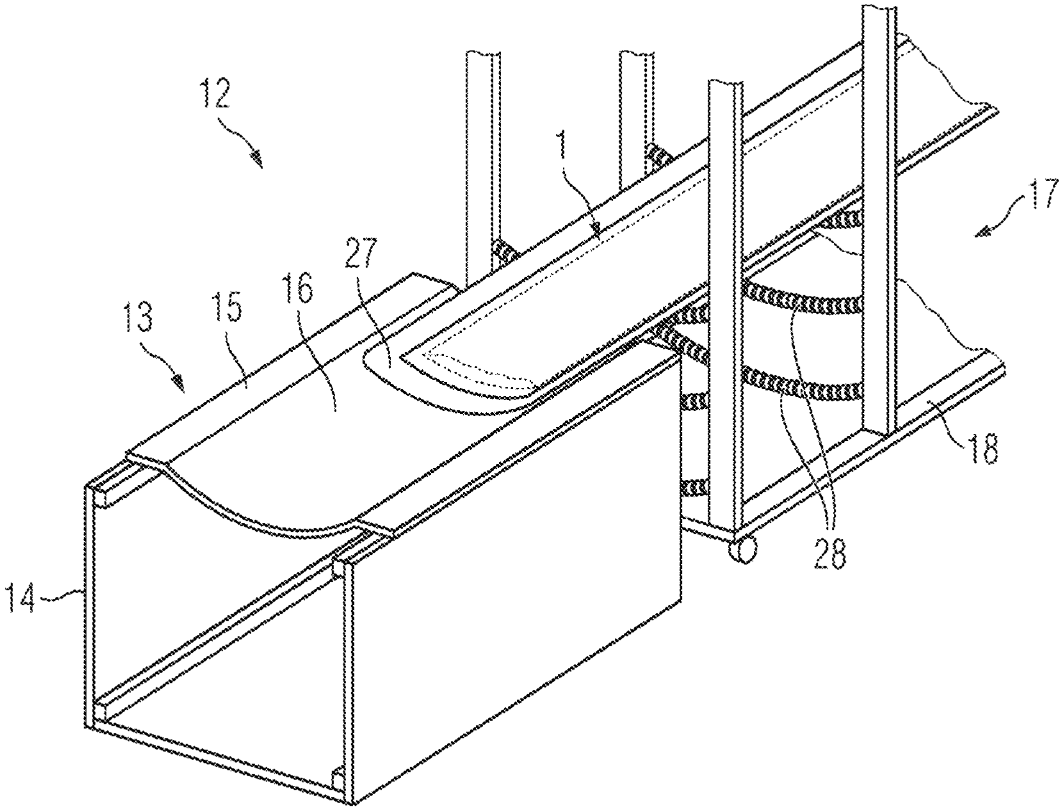
FIG. 14 shows another perspective and principle illustration of a mold arrangement comprising a flexible transport plate arranged in the mold.

FIG. 14 shows an embodiment of a mold arrangement 12 with a mold 13 having a mold carrier and a mold element 15, and with an associated transport means 17 again in form of a rack 18. In this embodiment, a thin, flexible transport plate 27 is arranged on the tray-like mold surface 16, which transport plate 27 completely adapts to the shape of the mold surface 18, and is therefore also tray-like. On this transport plate 27, the vacuum bag 1 respectively its layers 3, 3*a*, 3*b*, 4, and the building material 2 is arranged, whereafter the vacuum bag 1 is sealed and evacuated, so that the defined tray-like shape is frozen and vacuum-fixated.

As FIG. 14 shows, the whole arrangement comprising the transport plate 27 and the vacuum bag 1 with the vacuum-fixated building material 2 is transferred to the rack 18, which comprises respective receiving means 28, for example ropes or cables with a number of rollers on them, allowing a simple pushing or pulling movement of the transport plate 27 with the vacuum bag 1 onto the respective receiving means 28. This transfer movement may be assisted, when from underneath the mold element 15 air is pressed under the transport plate 27, which builds an air cushion, on which the transport plate 27 hovers. This allows for a simple air-assisted movement.

Figure 15:
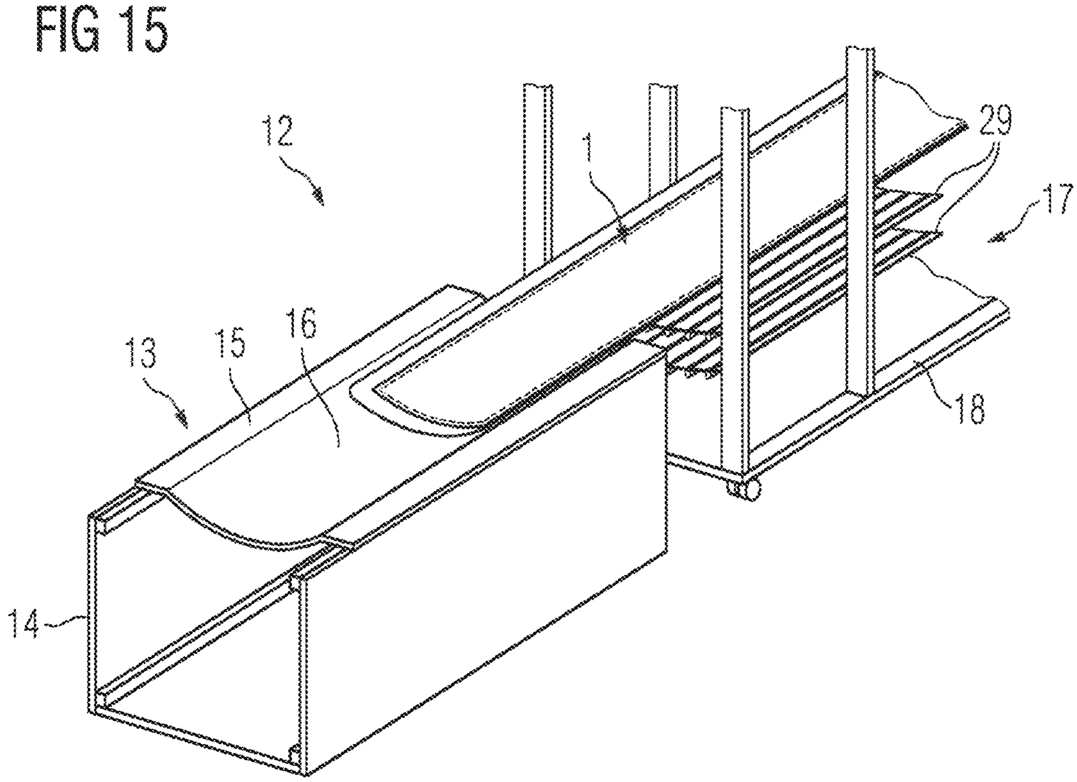
FIG. 15 shows another perspective principle illustration of a mold arrangement with an associated rack comprising flexible transport plates.

Another embodiment of a mold arrangement 12 is shown in FIG. 15. It comprises a mold 13 with a mold carrier 14 and a changeable mold element 15 with a tray-like mold surface 16 arranged on the carrier 14. A transport means 17 in form of a rack 18 is associated. This rack 18 is already provided with a number of flexible receiving plates 29, which are fixated to the rack 18. They are flexible and adapt their shape to the shape of the vacuum bag 1 with the vacuum-fixated building material 2, and therefore to the tray-like shape. The vacuum bag 1 with the building material 2 is transferred onto the respective receiving plate 29, which, just like the receiving means 28 in FIG. 14, can be vertically adjusted at the rack 18 so that, when several vacuum bags 1 shall be received, always an uncovered receiving plate 29 (or receiving means 28) can be perfectly positioned relative to the mold 13. The transfer of the vacuum bag 1, which is directly built on the mold surface 18, can be assisted by an air cushion applied from underneath.

Figure 16:
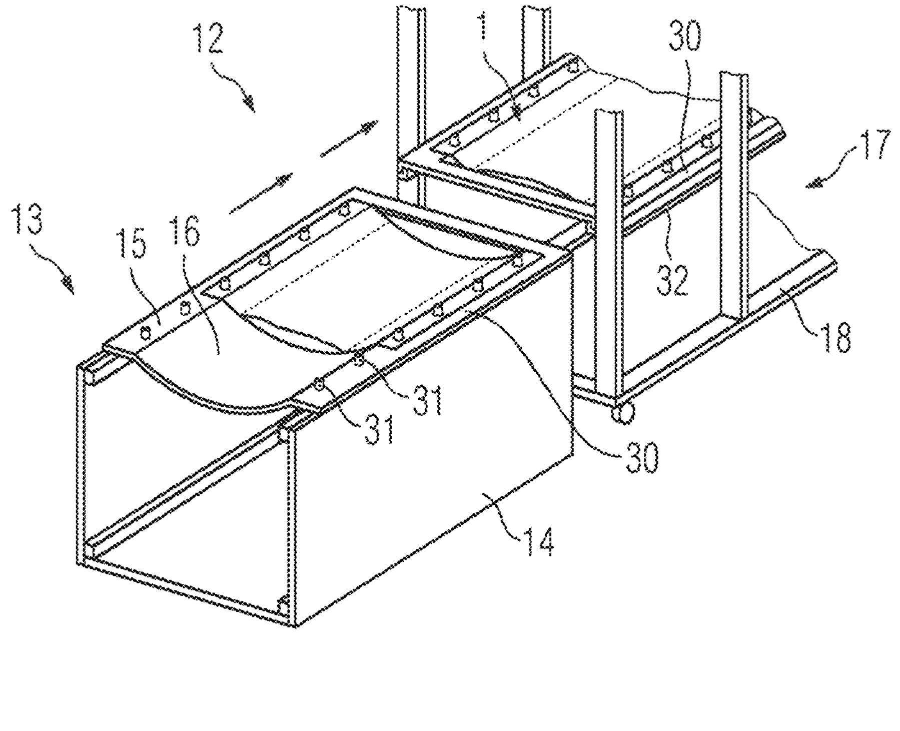
FIG. 16 shows a further perspective and principle illustration of a mold arrangement comprising a transferrable transport frame, with an associated transport means.

Another embodiment of a mold arrangement 12 is shown in FIG. 16. It again comprises a mold 13 with a mold carrier 14 and a mold element 15 with a tray-like mold surface 16. On this mold element 16, a transferable frame 30 having pins 31 extending at its upper surface is arranged. These pins 31, which may also be named as spikes, match with the respective holes 7 of the vacuum bag 1. So, the vacuum bag 1, already when not yet evacuated, but also when evacuated, is hooked to the frame 30. The frame 30 is rectangular and is not provided with any support in its middle, so that the vacuum bag 1 with the enveloped building material 2 hangs in the frame 30, it is suspended in the frame 30. The vacuum is sufficient to maintain the geometry of the vacuum-fixated building material 2 defined by the mold surface 16. Even if, due to the free hanging vacuum bag 1, the shape defined by the mold surface 13 slightly changes due to the gravity effect, this final shape may then correspond to the final requested shape the preform element shall have. Thus, the geometry of the mold surface 16 is designed such that it nearly corresponds to the requested final preform shape, which then finally is taken by the vacuum bag 1 and the building material 2 when it is freely suspended in the frame 30.

As shown, the frame 30 is transferred to the transfer means 17, again a rack 18, which is provided with the respective receiving means 32, like rails or the like, for receiving the frame 30.

Figure 17:
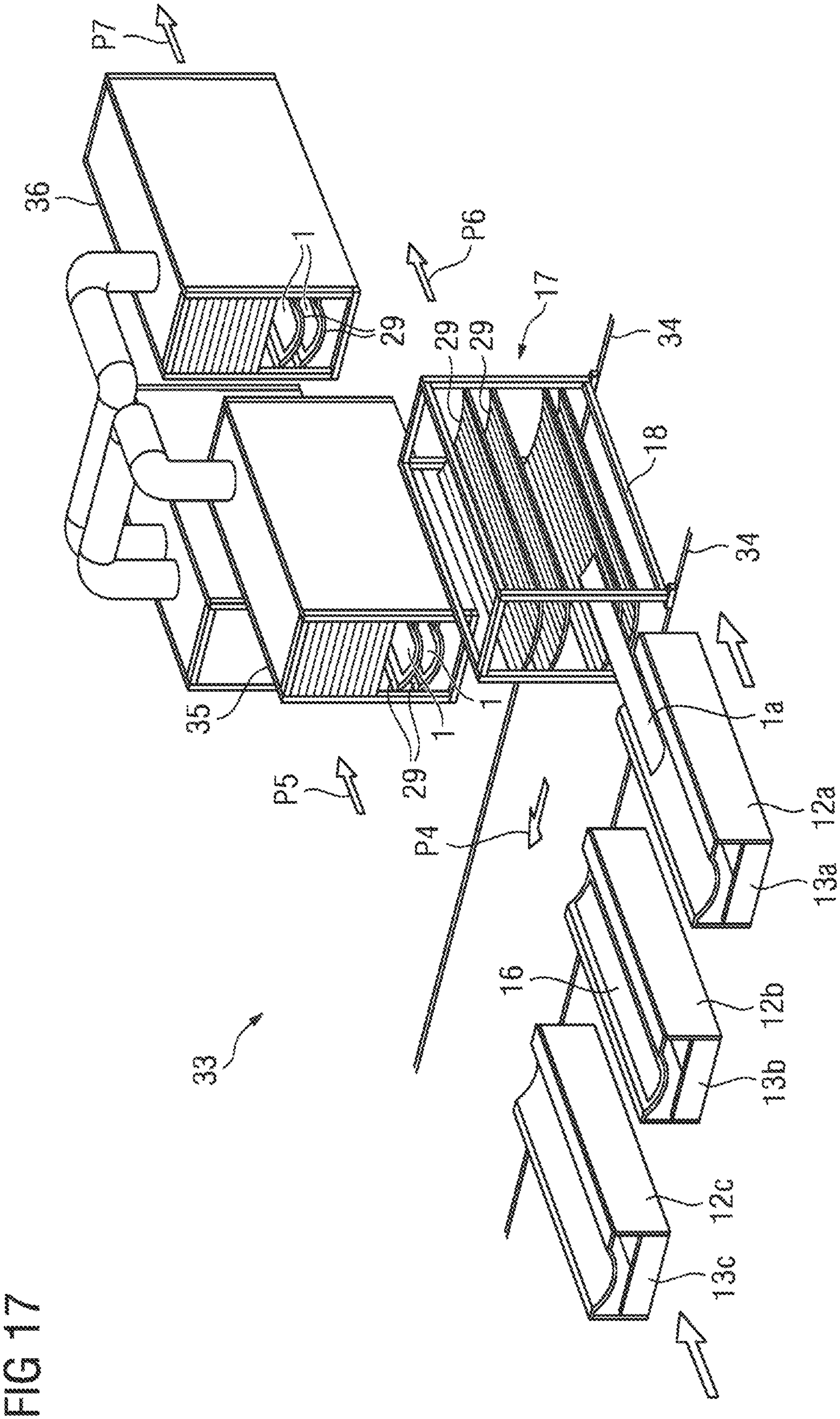
FIG. 17 shows a principle illustration of a manufacturing arrangement.

The transfer means 17 is used to first collect several evacuated vacuum bags 1 with the vacuum-fixated building material 2 and to transport them to a heating means for performing the heating step. An appropriate manufacturing arrangement 33 is shown in FIG. 17. The manufacturing arrangement 33 comprises several mold arrangements 12*a*, 12*b* and 12*c* with molds 13*a*, 13*b* and 13*c*. They are arranged in a line and parallel to each other. A transport means 17, here in form of a rack 18, is moving on guide rails 34 along the line of mold arrangements 12*a*, 12*b*, 12*c* for collecting the evacuated vacuum bags 1 with the vacuum-fixated building material 2 built on the respective molds 13*a*, 13*b*, 13*c*. In the embodiment shown in FIG. 17, the vacuum bag 1*a*, built on the mold 13*a* is just moved into the rack 18, which in this example is provided with the respective receiving plates 29. When the vacuum bag 1*a* with the building material 2 is completely transferred to the rack 18, the rack 18 moves to the mold 13*b*, as shown by the arrow P4, to collect the vacuum bag 1*b* with the building material built on the mold 13*b* on a respective receiving plate 29. After it has finally also collected a vacuum bag with the building material built on the mold 13*c*, the loaded rack 18 is positioned in front of a heating means 35 like a pre-temperature heating oven. The receiving plates 29 for example are moved from the rack 18 directly into the heating means 25, and with the receiving plates 29 also the respective vacuum bags 1 with the preform building material 2, which shall be heated to a desired temperature. This transfer is shown by the arrow P5. After the heating means 25 is completely loaded, the door is closed and the heating is performed, which is done relatively quickly, as the heating means 35 is pre-heated to the requested temperature.

After the time-controlled heating is finished, the receiving plates 29 with the vacuum bags 1, into which the now already heated preform building material is arranged, are transferred into a cooling means 36, where for example cooling air is introduced, for a controlled cooling of the heated building material. This is done in order to solidify or cure the melted binding agent so that a firm binder matrix is realized, which embeds and fixates the other building material like the fiber mats and the core material etc. in the desired geometry. The transfer from the heating means 35 to the cooling means 36 is shown by the arrow P6.

After the cooling is performed, desirably down to room temperature, the receiving plates 29 with the now cooled building material is removed from the cooling means, is shown by the arrow P7.

The cooled, and now finished preforms, which are still enveloped in the vacuum bags, are then either directly transferred for example by another rack to the building site, where the blade or blade part is finally built, or they are transferred to a storage area, in case they are not immediately used. In any way, the vacuum bag 1 is still covering and protecting the finally built preform element. The vacuum bag 1 is just removed directly before the final processing for building the blade or blade part.

Although the embodiment of FIG. 17 shows the rack 18 being equipped with respective receiving plates 29, it is certainly also possible to equip the rack 18 with respective transport belt means 19, so that only the vacuum bags 1, which are hooked onto the respective pins 21, are moved into the rack 18. In this case, either the whole rack 18 is moved into the heating means 35, and finally also into the cooling means 36. Or the heating means 35 and the cooling means 36 are also equipped with respective transport belt means for receiving the vacuum bags 1 in the same way as they were received on the rack 18.

And finally, it is also possible to equip the rack 18 and the heating means 35 and the cooling means 36 with respective receiving means for receiving the transferrable frame 30 with the vacuum bag 1.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for manufacturing a preform element made of preform building material for a wind turbine blade, comprising arranging the preform building material in a sealed vacuum bag arranged in a shape defining mold, whereafter evacuating the vacuum bag for vacuum fixating the preform building material in the shape defined by the mold, arranging a flexible transport plate in the mold adopting the shape of the mold, onto which the flexible transport plate, vacuum bag layers and the preform building material are arranged, wherein, after the vacuum fixation of the preform building material in the vacuum bag, transferring the flexible transport plate with the evacuated vacuum bag is to a transport means, via a rack.

2. The method according to claim 1, wherein sealing the vacuum bag layers by welding them together or by gluing them together.

3. The method according to claim 1, wherein arranging one or more connection means in the vacuum bag extending to the outside of the vacuum bag, by punching through an upper vacuum bag layer.

4. The method according to claim 3, wherein arranging a filter means in the vacuum bag to which the connection means is coupled.

5. The method according to claim 1, wherein a lower and/or an upper vacuum bag layer comprises two or more separate sublayers arranged in a stack.

6. The method according to claim 5, wherein arranging at least one stiffener between at least two sublayers of the lower vacuum bag layer.

7. The method according to claim 6, wherein one or more rods or a mesh or net made of a polymer or metal is used as the at least one stiffener.

8. The method according to claim 5, wherein the lower and upper vacuum bag layers made of a polymer material having a heat resistance of at least 90° C., or of at least 100° C. are used.

9. The method according to claim 1, wherein using or preparing the vacuum bag comprising several, reinforced, handling holes arranged at one or more side areas of the vacuum bag.

10. A method for manufacturing a preform element made of preform building material for a wind turbine blade, comprising arranging the preform building material in a sealed vacuum bag arranged in a shape defining mold, whereafter evacuating the vacuum bag for vacuum fixating the preform building material in the shape defined by the mold, transferring the evacuated vacuum bag with the fixated preform building material to a transport means, via a rack, wherein the transport means comprises a movable transport belt means with pins engaging in holes of the vacuum bag, which transport belt means pulls the vacuum bag onto the transport means.

11. A method for manufacturing a preform element made of preform building material for a wind turbine blade, comprising arranging the preform building material in a sealed vacuum bag arranged in a shape defining mold, whereafter evacuating the vacuum bag for vacuum fixating the preform building material in the shape defined by the mold, equipping the mold with a frame having fixation pins, engaging holes of one or both lower and upper vacuum bag layers with the fixation pins and after vacuum fixating the preform building material, transferring the frame with the evacuated vacuum bag to a transport means, via a rack, comprising receiving means for the frame.

12. A method for manufacturing a preform element made of preform building material for a wind turbine blade, comprising arranging the preform building material in a sealed vacuum bag arranged in a shape defining mold, whereafter evacuating the vacuum bag for vacuum fixating the preform building material in the shape defined by the mold, providing a heating means and a cooling means following the heating means, which either comprises or comprise a movable transport belt means with pins engaging holes in the vacuum bag, pulling the vacuum bag with the transport belt means into the heating means or the cooling means, or which comprises or comprise transferring a frame or a flexible transport plate onto a receiving means.

13. A method for fabricating a vacuum bag for manufacturing a preform element made of preform building material for a wind turbine blade comprising:

providing a wind turbine blade mold arrangement for the preform building material comprising a mold, a mold carrier and a mold element having a mold surface;

arranging a first roll and a second roll, each of the first and second rolls comprising a vacuum layer material at one end of the mold carrier;

unwinding the first and second rolls onto the mold element; and providing at least one welding bar on the mold carrier and extending along edge portions of the vacuum layer material of the first and second rolls, wherein the first roll is wider than the second roll, and wherein the first roll comprises holes along the edge portions of the vacuum layer material thereof.

* * * * *